US010583781B2

(12) United States Patent
Huang et al.

(10) Patent No.: US 10,583,781 B2
(45) Date of Patent: Mar. 10, 2020

(54) DRIVING ASSISTANCE SYSTEM AND DRIVING ASSISTANCE METHOD

(71) Applicants: Shanghai XPT Technology Limited, Shanghai (CN); INTELLIGENCE & PARTNER LIMITED, Hong Kong (HK)

(72) Inventors: Mu-Jen Huang, Taipei (TW); Ya-Li Tai, Taoyuan (TW); Yu-Sian Jiang, Kaohsiung (TW)

(73) Assignees: Shanghai XPT Technology Limited, Shanghai (CN); Mindtronic AI Co., Ltd., Grand Cayman (KY)

(*) Notice: Subject to any disclaimer, the term of this patent is extended or adjusted under 35 U.S.C. 154(b) by 0 days.

(21) Appl. No.: 15/908,686

(22) Filed: Feb. 28, 2018

(65) Prior Publication Data
US 2018/0370433 A1 Dec. 27, 2018

(30) Foreign Application Priority Data

Jun. 27, 2017 (CN) .......................... 2017 1 0502231
Jun. 27, 2017 (CN) ..................... 2017 2 0756894 U

(51) Int. Cl.
B60R 1/00 (2006.01)
H04N 5/33 (2006.01)
G06K 9/00 (2006.01)
H04N 5/272 (2006.01)
H04N 5/265 (2006.01)

(52) U.S. Cl.
CPC ............ *B60R 1/00* (2013.01); *G06K 9/00805* (2013.01); *G06K 9/00825* (2013.01); *H04N 5/265* (2013.01); *H04N 5/272* (2013.01); *H04N 5/33* (2013.01); *B60R 2300/108* (2013.01); *B60R 2300/301* (2013.01); *B60R 2300/307* (2013.01)

(58) Field of Classification Search
None
See application file for complete search history.

(56) References Cited

U.S. PATENT DOCUMENTS

| 6,254,259 B1 * | 7/2001 | Kobayashi | B60Q 1/085 340/459 |
| 6,521,892 B2 * | 2/2003 | Emanuel | B60R 1/00 250/332 |
| 6,831,261 B2 * | 12/2004 | Schofield | B60N 2/002 250/205 |
| 8,600,656 B2 * | 12/2013 | Mimeault | B60Q 1/0023 701/301 |

(Continued)

Primary Examiner — Sath V Perungavoor
Assistant Examiner — Tyler B Edwards
(74) Attorney, Agent, or Firm — Winston Hsu

(57) ABSTRACT

A driving assistance system includes a database configured to store numbers of preset criteria concerning various driving conditions, a sensor, configured to sense environmental data surrounding a vehicle; a thermal image capturing device, configured to capture a thermal images surrounding the vehicle; a display device; and a processor, coupled to the sensor, the thermal image capturing device and the display device. The processor compares the environmental data against the preset criteria to determine the driving condition of the vehicle. The display device automatically display thermal images to inform and provide precautions to the driver if the driving condition indicates that the driver's vision is adversely affected.

16 Claims, 7 Drawing Sheets

(56) References Cited

U.S. PATENT DOCUMENTS

| | | | |
|---|---|---|---|
| 2003/0095080 A1 | 5/2003 | Colmenarez | |
| 2003/0122930 A1* | 7/2003 | Schofield | B60R 1/00 348/148 |
| 2004/0257442 A1* | 12/2004 | Eggers | B60R 1/00 348/148 |
| 2005/0072921 A1* | 4/2005 | Moisel | B60R 1/00 250/330 |
| 2005/0110621 A1* | 5/2005 | Hahn | B60R 1/00 340/435 |
| 2006/0291849 A1* | 12/2006 | Shamir | G03B 7/08 396/334 |
| 2010/0309315 A1* | 12/2010 | Hogasten | H04N 5/33 348/164 |
| 2011/0074955 A1* | 3/2011 | Kuehnle | G01W 1/14 348/148 |
| 2014/0198213 A1* | 7/2014 | Liken | B60Q 1/1423 348/148 |
| 2015/0145996 A1 | 5/2015 | Watanabe | |
| 2016/0223588 A1 | 8/2016 | Fox | |
| 2016/0232423 A1* | 8/2016 | Zhong | B60Q 1/20 |

* cited by examiner

DRIVING ASSISTANCE SYSTEM AND DRIVING ASSISTANCE METHOD

BACKGROUND OF THE INVENTION

1. Field of the Invention

The present invention relates to a driving assistance system and a method thereof, and more particularly, to a driving assistance system and a method thereof capable of providing information and precautions when the driving condition is poor.

2. Description of the Prior Art

Modern vehicles concern about safety and better driving experience. Several kinds of driving assistance systems are proposed to meet the purpose. A conventional driving assistance system in a modern vehicle usually equip with numbers of sensors to obtain data surrounding the vehicle. The data is used to provide useful information and assist the driver. For instance, an image capture device (e.g. a camera) may capture a speed limit sign and process thereof to remind the driver when the speed exceeds the limit. Moreover, the driving assistance system may also include, for instance, a radar and a thermal sensor to sense the velocity and distance of the vehicle ahead to mitigate the chance of collision. An exemplary design of a thermal sensor is disclosed in the Chinese Patent no. 106114365A.

SUMMARY OF THE INVENTION

The present invention provides a driving assistance system in a vehicle. The system includes: a database, configured to store a plurality of preset criteria concerning a plurality of driving conditions; sensor, configured to collect environmental data surrounding the vehicle; a thermal image capturing device, configured to capture a thermal image surrounding the vehicle; a display device; and a processor, coupled to the sensor, the thermal image capturing device and the display device, configured to determine a driving condition of the subject vehicle by comparing the environment data against the preset criteria; wherein if the result indicates that the driver's vision is adversely affected because of the driving condition, the display device automatically display the thermal images to inform the driver as to the surrounding circumstance.

The present invention further provides a driving assistance method of a vehicle. The method includes: presetting a plurality of criteria to indicate a plurality of driving conditions in a database; collecting environmental data and thermal images surrounding the vehicle; determining one of the driving condition of the vehicle by comparing the collected environmental data against the preset criteria; and automatically displaying the thermal images on a display if it is determining that the driving condition adversely affect the driver's vision from the vehicle.

These and other objectives of the present invention will no doubt become obvious to those of ordinary skill in the art after reading the following detailed description of the preferred embodiment that is illustrated in the various figures and drawings.

DETAILED DESCRIPTION

The invention provides a driving assistance system and a method thereof that provides precautions and proactive assistance to a driver of a vehicle when the driving condition of the vehicle is hazy, and the driver's vision may therefore be adversely affected.

Figure 1:
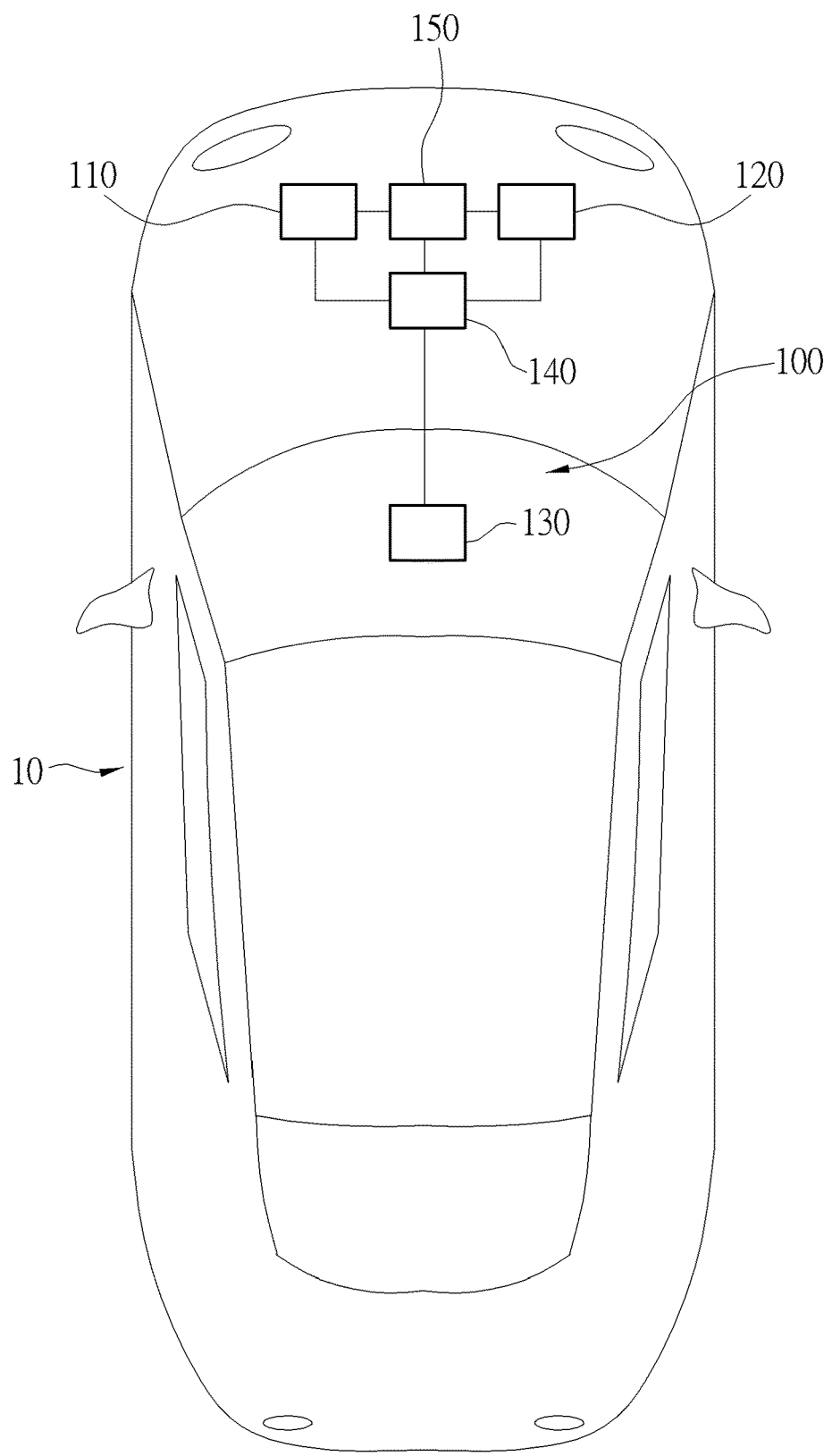
FIG. 1 is a schematic diagram of a driving assistance system according to an embodiment of the present invention.

FIG. 1 is a schematic diagram of a driving assistance system according to an embodiment of the present invention. As shown, the driving assistance system 100 of the present invention is disposed in a vehicle 10. The driving assistance system 100 of the present invention may include a sensor 110, a thermal image capturing device 120, a display device 130 and a processor 140. Additionally, the driving assistance system 100 may also include a database (not illustrate in FIG. 1) that stores numbers of preset criteria concerning various driving conditions. Each of the driving conditions indicates if the driver's vision may be adversely affected and therefore urges for assistances. The database may be kept in a storage unit 150.

The sensor 110 collects environmental data surrounding the vehicle 10. The thermal image capturing device 120 captures thermal images also surrounding the vehicle 10. The processor 140 is coupled to the sensor 110, the thermal image capturing device 120, the display device 130 and the storage 150 unit. The processor 140 processes the environmental data and compares the result against the preset criteria stored in the database to conclude one of the driving conditions of the vehicle. Once concluded, the processor 140 further determines whether to display thermal images obtained by the thermal image capturing device 120 on the display device 130 because the driving condition is so poor that adversely affects the driver's vision. More precisely, if it is concluded that the driving condition is so hazy that the driver's vision is affected, the processor displays the thermal images on the display device 130 to inform the driver about the objects surrounding the vehicle 10.

Figure 2:
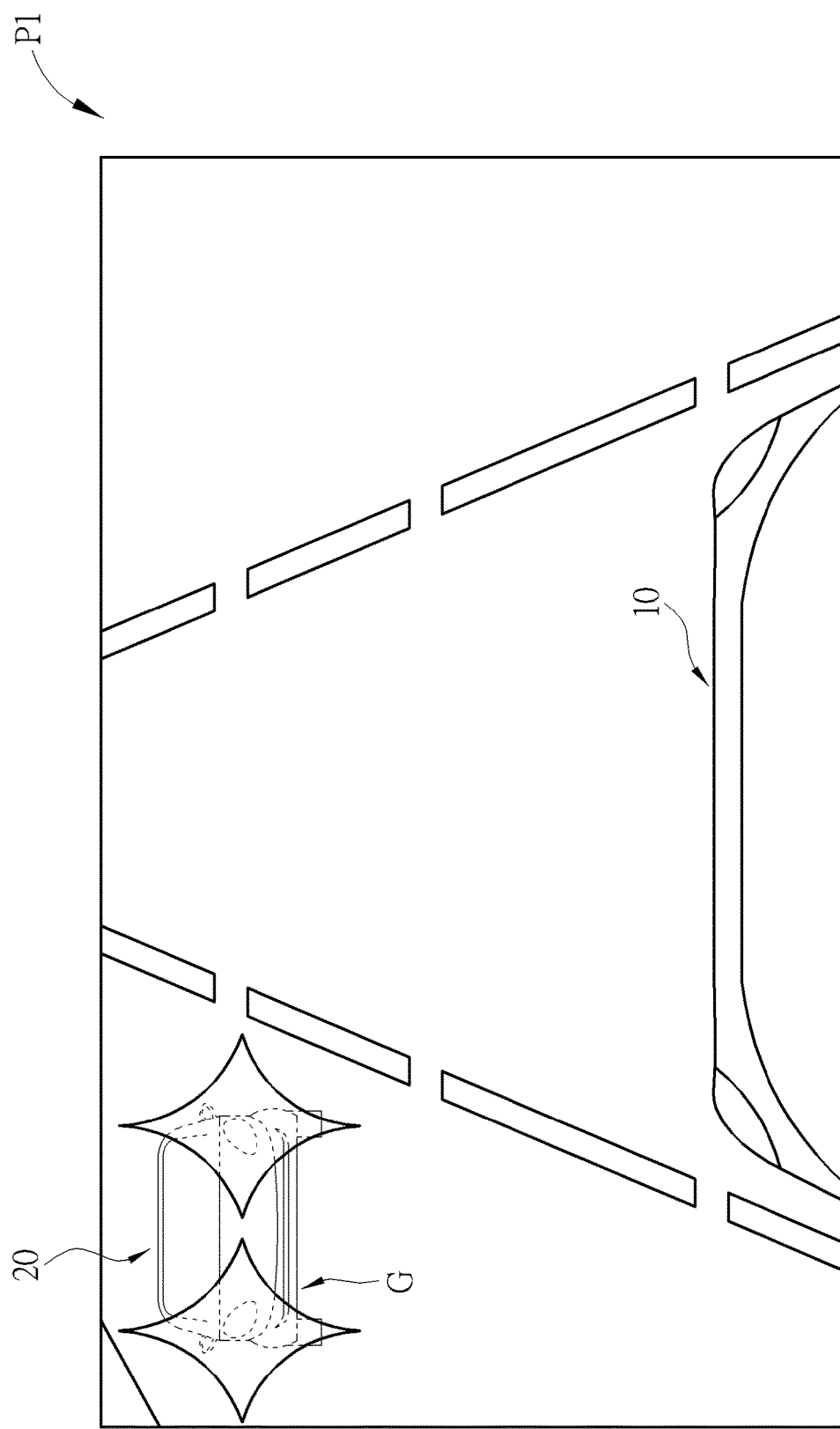
FIG. 2 is a schematic diagram of determining the driving condition by the driving assistance system according to the first embodiment of the present invention.

In one embodiment, the driving condition of the vehicle 10 may be determined based on a glaring area on a visible light image captured by the sensor 110 which, in the current embodiment, may be an image sensor and configured to capture visible light images in front of the vehicle 10. FIG. 2 illustrates such embodiment. As shown, the sensor 110 captures a visible light image P1 ahead of the vehicle 10. The processor 140 processes the image P1 and determines that there is a glaring area G on the image P1. The processor 140 then compares the relevant data against the stored criteria and concludes that a vehicle 20 is approaching in the opposite direction and its headlights induce the glaring area G that is negatively affecting the vision of the driver in the vehicle 10.

In one example, the comparison can be made by reference to the size or the pixel amount of the glaring area G. For instance, if the size or the pixel amount of the glaring area G is greater than the preset criteria stored in the database, it is concluded that the light illuminated from the headlights of the approaching vehicle 20 affects the vision of the driver in the vehicle 10. Consequently, the display device 130 automatically displays the thermal images obtained by the thermal image capturing device 120. As such, the driver of the vehicle 10 can be instantly informed about the objects surrounding the vehicle 10.

Alternatively, the determination may also be made by reference to the size ratio (or the ratio of the pixel amount) of the glaring area G and the image P1. For instance, if the size of the glaring area G is greater than 10% of the size of the image P1 (or the pixel amount of the glaring area G is greater than 10% of the total pixel amount of the image P1), it is concluded that the driver's vision is affected and the thermal images should be automatically displayed on the display device 130 to inform the driver about the surrounding condition and provide necessary precautions. One should understand that the 10% ratio mentioned above is a mere example, it should not limit the scope of the invention.

Figure 3:
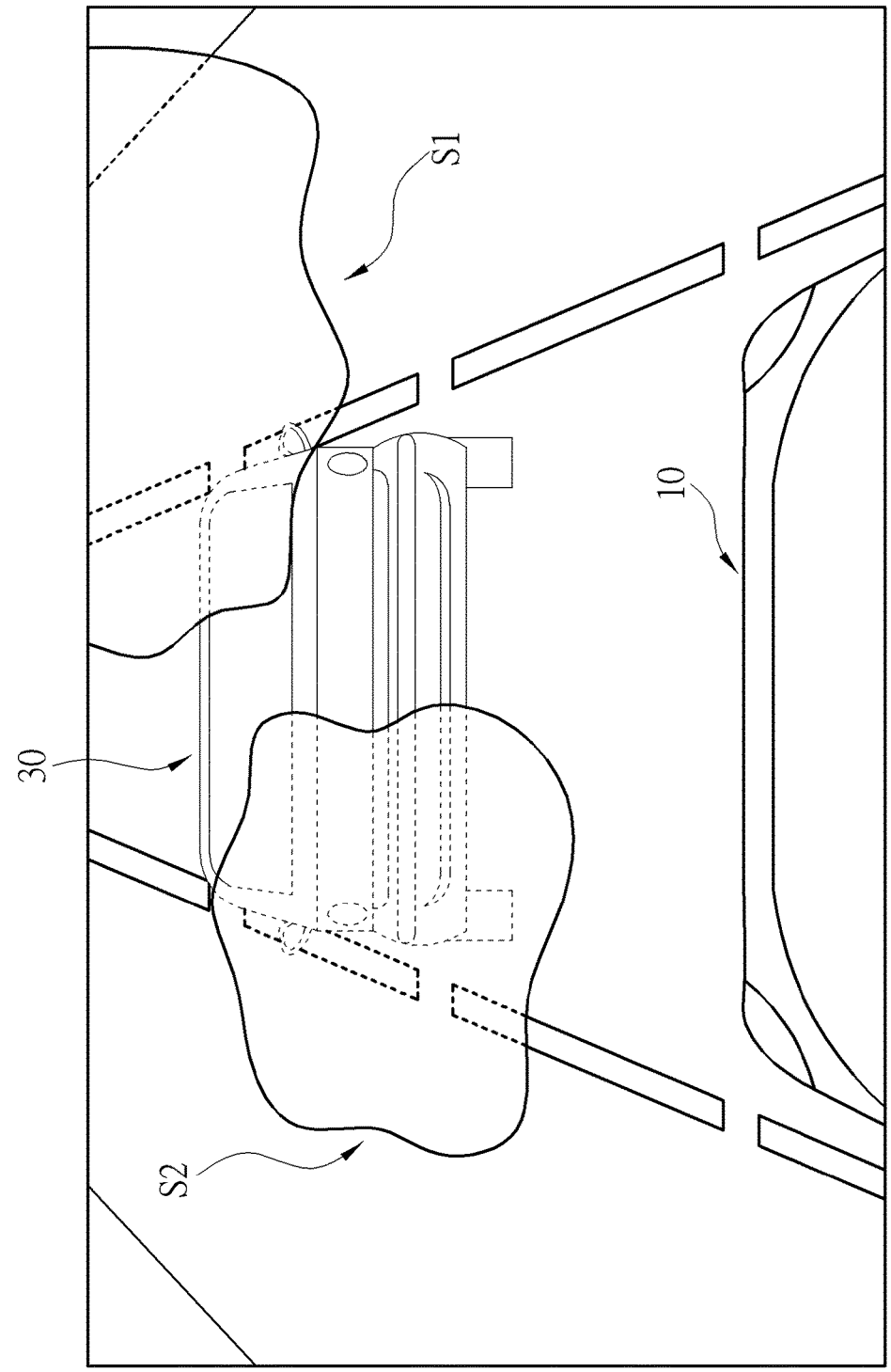
FIG. 3 is a schematic diagram of determining the driving condition by the driving assistance system according to the second embodiment of the present invention.

In another embodiment, the driving condition of the vehicle 10 may be determined based on the degree of blurriness of an object's edge on a visible light image captured by the sensor 110 which, in the present embodiment, may be an image sensor and configured to capture visible light images in front of the vehicle 10. FIG. 3 illustrates the embodiment. As shown, the sensor 110 captures a visible light image P2 ahead of the vehicle 10. The processor 140 processes the image P2 and determines that there are foggy areas S2 and S3 on the image P2. The processor 140 then compares the relevant data against the stored criteria. If the criteria are met, it indicates the weather is so misty that causes the objects on the image P2 blurred, which implies that the driver of the vehicle 10 may not be able to see the vehicle 30 in front of him/her.

In one example, the driving condition may be determined by reference to an object's border, e.g. the vehicle 30, on the image P2. If the degree of the blurriness reaches a preset criterion stored in the database, it is concluded that the foggy condition is serious and affects the driver's vision. Under such circumstance, the thermal images are automatically displayed on the display device 130 to assist the driver of the vehicle 10 to see objects in front straight.

Alternatively, the processor 140 may extract the relevant pixels, e.g. the edge of vehicle 30 and the neighboring scene, from the image P2 and calculate the degree of blurriness based on the difference in pixel brightness. For instance, if the brightness difference from the extracted pixels is less than 60%, it means the misty condition is serious that the vehicle 30 ahead is blended with the neighboring scene which will cause the driver a trouble of recognizing the vehicle 30 clearly. Additionally, the processor 140 may further determine to what degree the vehicle 30 is affected by the foggy condition to determine if the driver's vision is affected. For instance, if more than 50% of the vehicle 30 is blurred because of the misty condition, it is concluded that the driver's vision is going to be affected. Consequently, the thermal images obtained by the thermal image capturing device 120 are displayed on the display device 130 automatically to inform the driver about the objects ahead.

In another embodiment, the sensor 110 may be a light intensity sensor configured to sense the intensity of ambient light surrounding the vehicle 10. The processor 140 determines the driving condition of the vehicle 10 based on the light intensity. Assuming a driver is driving the vehicle 10 on a driveway. The sensor 110 senses the intensity of the ambient light surrounding the vehicle 10. In one example, if the intensity of the surrounding ambient light is smaller than a preset threshold, e.g. 30 nits, the processor 140 may then conclude that the vehicles 10 is driving under a dark condition (e.g. at night) and the driver may not be able to see things straight. In this circumstance, the display device 130 automatically displays the thermal images obtained by the thermal image capturing device 120 to inform the driver as to the nearby objects and provides necessary precaution accordingly. On the other hand, if the intensity of the surrounding ambient light is greater than another preset threshold, e.g. 2000 nits, the processor 140 may conclude that the vehicle 10 is driving under a strong light environment which may be caused by an approaching vehicle's headlights. Similarly, in such situation, the display device 130 automatically displays the thermal images so that the driver can be informed about the objects ahead.

In one embodiment of the present invention, the sensor 110 is a particulate matter (PM) sensor and configured to sense a PM concentration surrounding the vehicle 10. The processor 140 determines whether to automatically display thermal images on the display device 130 based on the sensed PM concentration. For example, when a driver is driving the vehicle 10 on a driveway under a smoggy driving condition, the sensor 110 senses the surrounding PM concentration. The processor 140 then determines whether the driving condition is so smoggy that may affect the driver's vision based on the PM concentration. For instance, if the PM concern reaches a preset threshold, e.g. 50 microgram/m$^3$, stored in the database, the processor 140 then concludes that the high volume of particles in the air causes the hazy driving condition and is affecting the driver's vision. Consequently, the display device 130 automatically displays the thermal images obtained by the thermal image capturing device 120 to inform the driver with the surrounding objects and provide proper precautions.

In a further embodiment of the present invention, the sensor 110 is configured to sense the temperature and humidity surrounding the vehicle 10. The processor 140 is configured to determine the driving condition where the vehicle 10 is current under and whether to automatically display thermal images accordingly to assist the driver. For example, when a driver is driving the vehicle 10, the sensor 110 senses the temperature and humidity surrounding the vehicle 10. The processor 140 processes the collected data and compares it against the criteria stored in the database to determine the driving condition. Assuming the temperature and humidity detected reach the preset thresholds, for instance, the 80% humidity and 15° C. temperature, the combination of the two parameters conclude that the weather is foggy and the driving condition is misty. The driving condition may therefore affect the driver's ability see things surrounding the vehicle 10. In such case, the thermal images of the objects ahead of the vehicle 10 obtained by the thermal image capturing device 120 are automatically displayed on the display device 130 to assist the driver and provide proper precautions.

Figure 4:
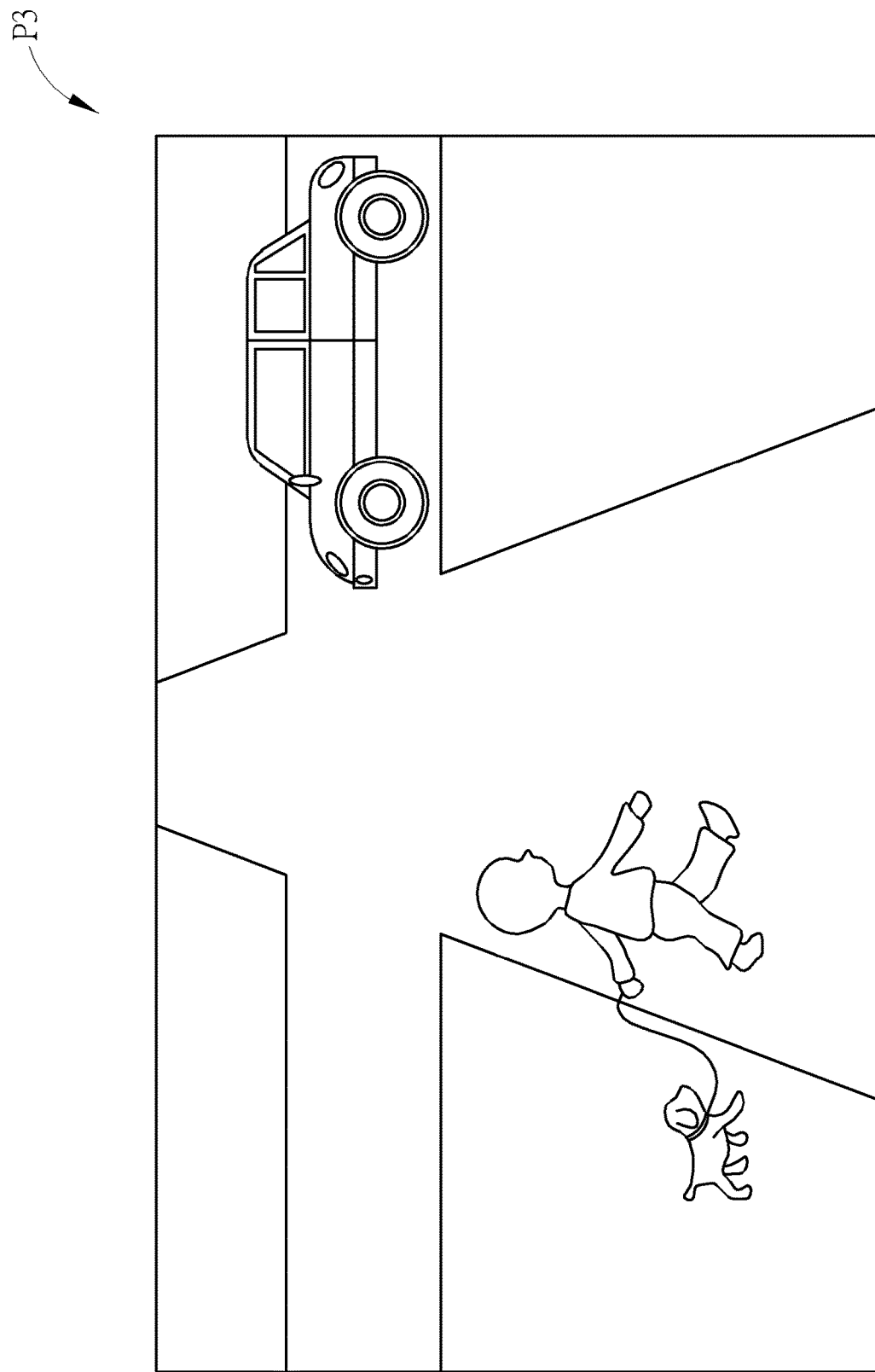
FIG. 4 is a schematic diagram of the visible light image P3 captured by the sensor shown in FIG. 1.
Figure 5:
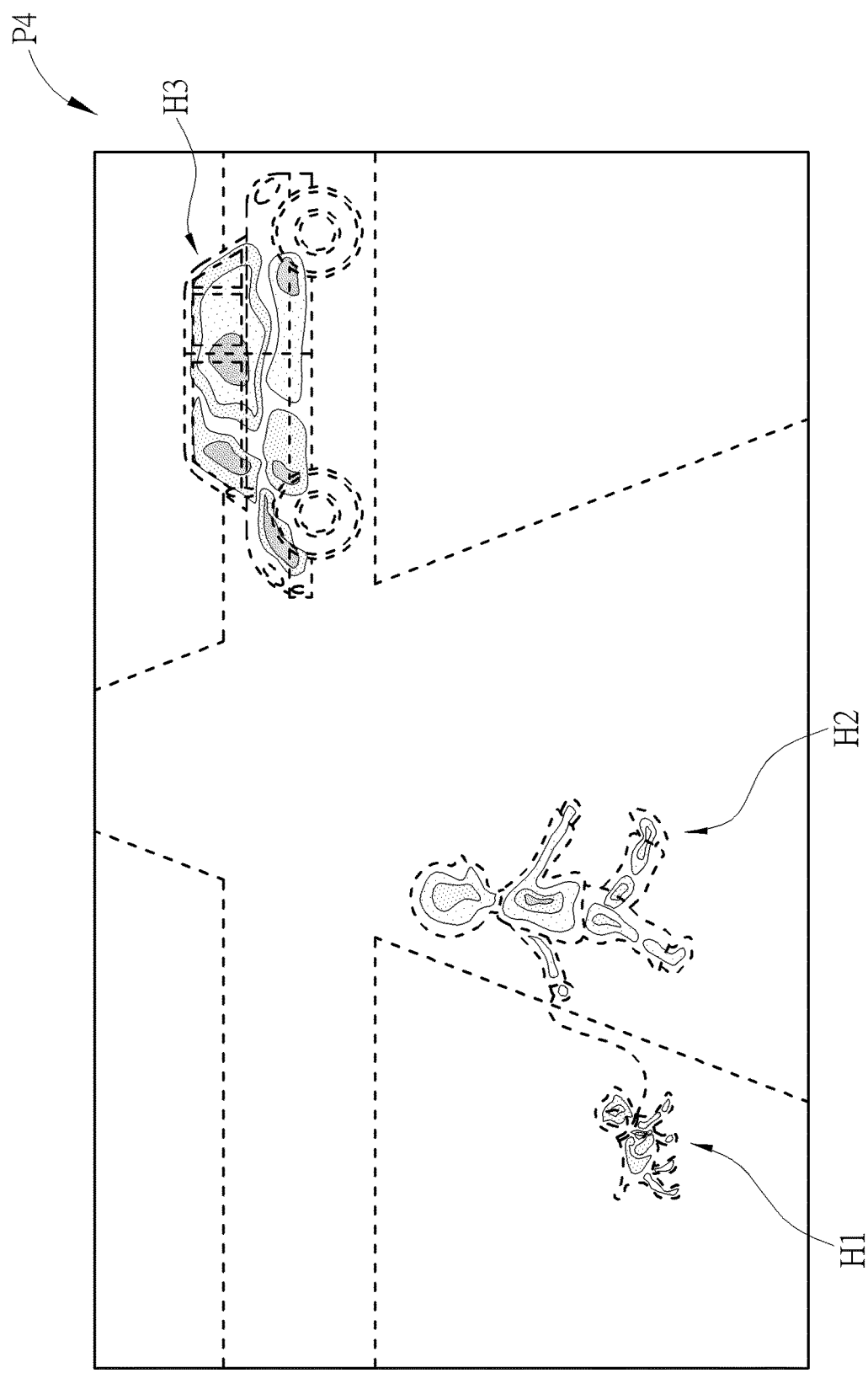
FIG. 5 is the schematic diagram of the thermal image P4 captured by the thermal image capturing device shown in FIG. 1.
Figure 6:
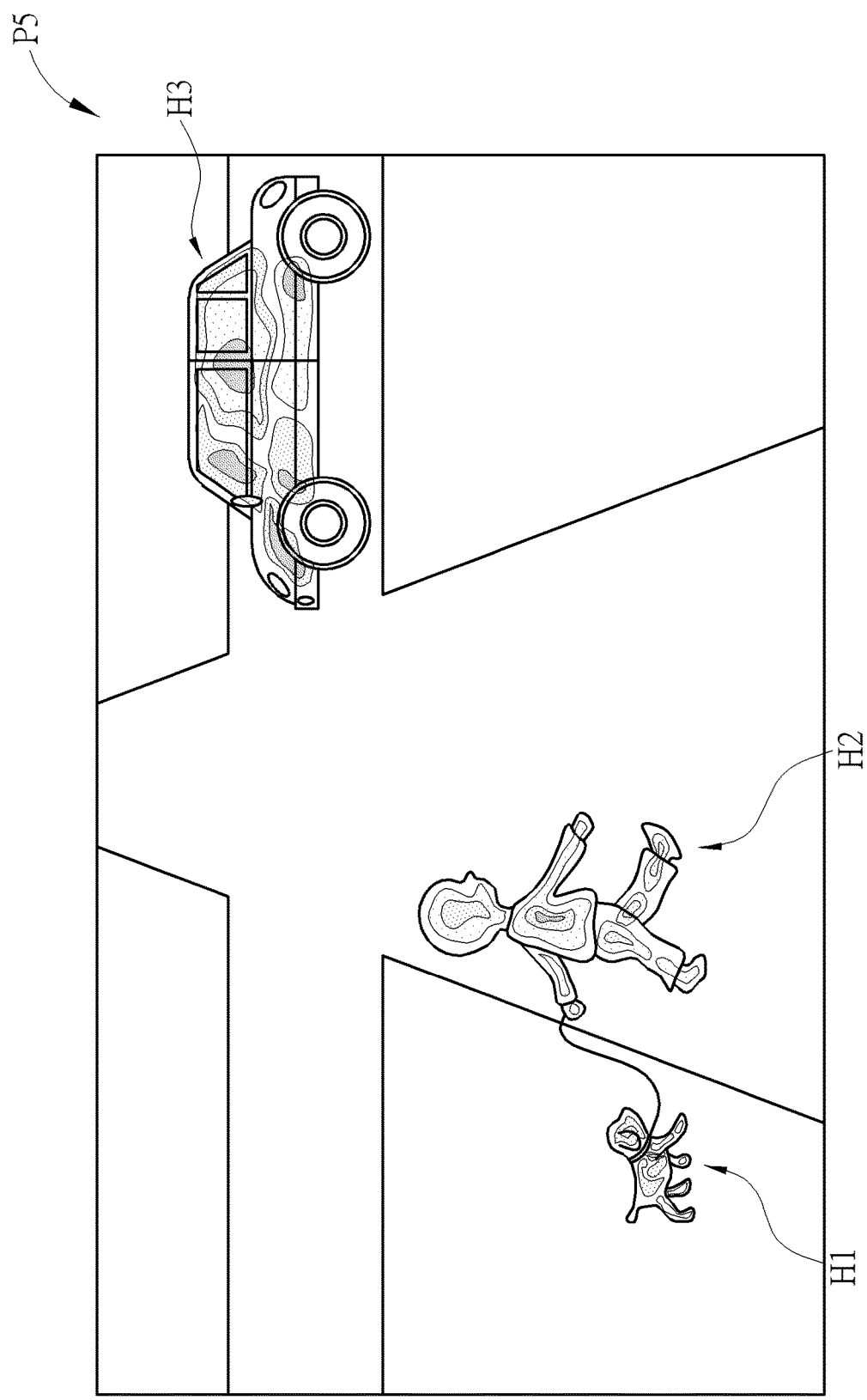
FIG. 6 is the schematic diagram of the superposition image P5 generated by the processor shown in FIG. 1.

The driving assistance system 100 of the present invention controls the display device to automatically display the thermal images of the objects ahead of the vehicle 10 when the data sensed by the sensor 110 indicates that the driving condition is not ideal. Additionally, the driving assistance system 100 of the present invention may further process thermal images. That is, the processor 140 may process both the visible light images sensed by the sensor 110 and the thermal images obtained by the thermal image capturing device 120 to present processed images. If the resolutions of the images from two sources are different, the processor 140 unifies the resolutions by way of, say, interpolation before processing the two images. The processed images are then displayed on the display device 130. FIG. 4-6 illustrate the present embodiment. FIG. 4 shows a visible light image P3 captured by the sensor 110; FIG. 5 illustrates a thermal image P4 captured by the thermal image capturing device 120, while FIG. 6 shows an image P5 obtained by superposing the images P3 and P4.

In one embodiment, the sensor 110 is an imaging sensor and configured to capture the visible light image P3 in front of the vehicle 10. The processor 140 is configured to superpose the thermal image P4 and the visible light image P3 to generate the image P5. When the processor 140 determines that the driving condition of the vehicle is so terrible that the driving assistance system of the present invention must be called, the display device 130 automatically displays the image P5. It should be noted that the processor 140 is able to identify the high temperature regions H1, H2 and H3 from the thermal image P4. The image P5 is obtained by superposing the high temperature regions H1, H2 and H3 from the image P4 and the corresponding regions on the image P3. The rationale behind such superposition is the body temperature of a biological animal is usually higher than that of an non-biological object. As a result, areas with high temperatures are more likely to the objects of concern, such as pedestrians, animals or moving vehicles. As shown in FIG. 6, the concerned objects can be further emphasized on the image, such that the driver can pay timely attentions to the objects since they could be pedestrians, animals or moving cars. Further, the way of superposition may involve multiplying the grey scale values of the images P3 and P4 to a weighting. In the above discussion the only areas with high temperature are taken into accounts when conducting the superposition process; it however should not constitute a limitation to the present invent. One may decide to consider the entire areas of the images P3 and P4 for superposition.

It should be noted that the storage unit 150 of the present driving assistance system 100 may also store the visible light images, the thermal images, and the generated images.

In addition, in the embodiments stated above, the thermal image capturing device 120 may constantly capture thermal images surrounding the vehicle 10. Or it may only be enabled to capture thermal images when the driving condition is so bad that the assistance function is required. The thermal image capturing device 120 may be turned on at different points of time according to the requirements and the designs.

Figure 7:
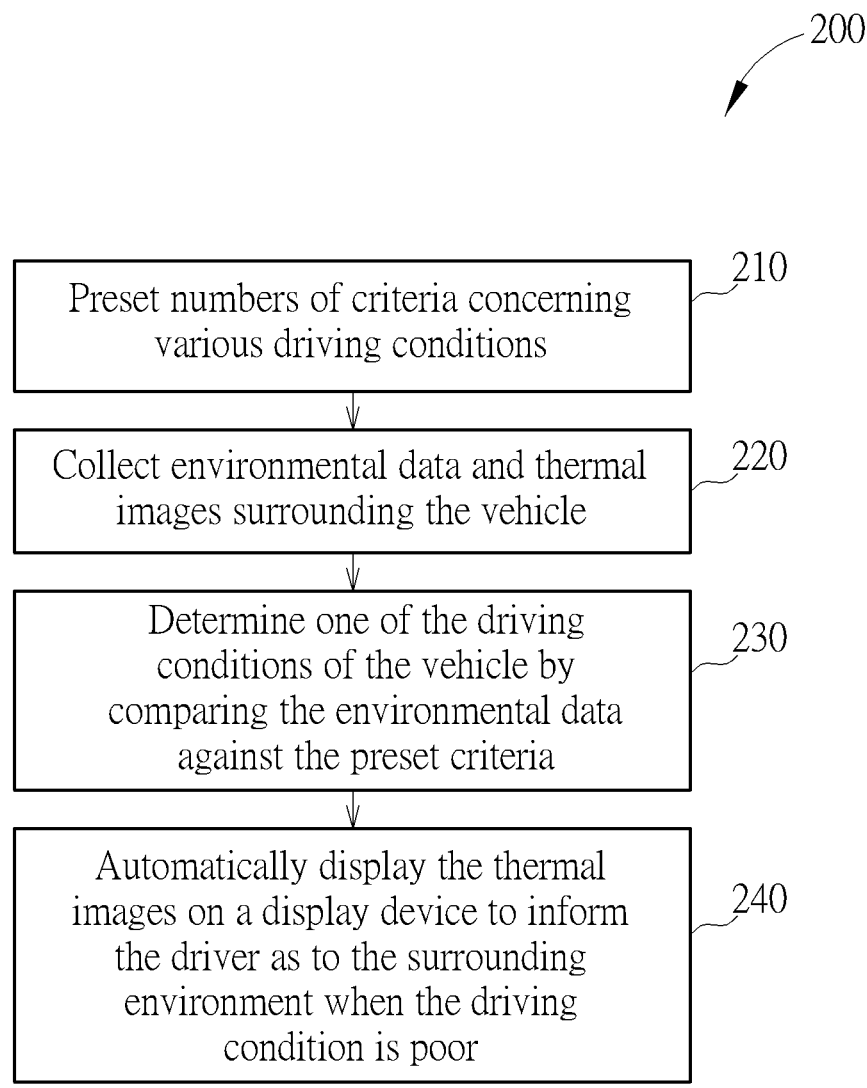
FIG. 7 illustrates a process of a driving assistance method according to an embodiment of the present invention.

FIG. 7 illustrates a method 200 of providing a driving assistance to a driver in accordance with the present invention. The method 200 includes the following steps:

Step 210: Preset numbers of criteria concerning various driving conditions.

Step 220: Collect environmental data and thermal images surrounding the vehicle.

Step 230: Determine one of the driving conditions of the vehicle by comparing the environmental data against the preset criteria.

Step 240: Automatically display the thermal images on a display device to inform the driver as to the surrounding environment when the driving condition is poor.

Furthermore, it should be understood the above steps are provided to clarify how the driving assistance method of the present invention works. One may add more driving conditions or providing more sophisticated steps to perform the method.

The driving assistance system and the method thereof described herein capable of automatically displaying the thermal images on the display device if the driving condition so urges. More precisely, the present invention provides a system and a method to properly and instantly inform the driver about the surrounding conditions, for instance, approaching cars, pedestrians and/or animals, when the driver's vision is impacted because of the poor driving condition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving assistance system in a subject vehicle, comprising:
    a database configured to store a plurality of preset criteria;
    a sensor configured to collect environmental data surrounding the subject vehicle;
    a thermal image capturing device configured to capture a plurality of thermal images surrounding the subject vehicle;
    a display device; and
    a processor coupled to the sensor, the thermal image capturing device and the display device, and configured to compare the environment data against at least one of the preset criteria, and determine one of a plurality of driving conditions indicating that the driver's vision is adversely affected when one of the preset criteria is met; wherein when the one of the driving condition indicating that the driver's vision is adversely affected is determined, the display device automatically displays the thermal images to inform the driver as to a surrounding circumstance;
    wherein the environmental data includes a visible light image collected by the sensor, one of the preset criteria includes a criterion of a glaring area on the visible light image, and the processor determines that the vehicle in the opposite direction is approaching toward the subject vehicle and the illumination from the headlights adversely affects the driver in the subject vehicle when a size of the glaring area, a pixel amount of the glaring area, or a size ratio of the glaring area and the entire visible light image exceeds a predetermined threshold.

2. The driving assistance system of claim 1, wherein one of the preset criteria includes a criterion of an intensity of ambient light; and the processor determines that a surrounding of the subject vehicle is dark such that the driver's vision is adversely affected when the intensity of ambient light is less than a predetermined threshold.

3. The driving assistance system of claim 1, wherein one of the driving conditions is when the weather is misty such that the driver's vision is adversely affected.

4. The driving assistance system of claim 3, wherein the environmental data includes a visible light image collected by the sensor, one of the preset criteria includes a criterion of a foggy area on the visible light image; and the processor determines that the weather is misty such that the driver's vision is adversely affected when a degree of blurriness of an object on the visible light image exceeds a predetermined threshold.

5. The driving assistance system of claim 3, wherein the environmental data includes a visible light image collected by the sensor, one of the preset criteria includes a criterion of a foggy area on the visible light image; and the processor determines that the weather is misty such that the driver's vision is adversely affected when a brightness difference between an object and its neighboring scene is less than a predetermined threshold.

6. The driving assistance system of claim 3, wherein the environmental data includes a temperature and a humidity collected by the sensor, one of the preset criterion includes a criteria of a temperature and a humidity; and the processor determines that the weather is misty such that the driver's vision is adversely affected when the temperature and the humidity meet the preset criteria.

7. The driving assistance system of claim 1, wherein the environmental data includes a particulate matter (PM) concentration collected by the sensor, one of the preset criterion includes criteria of the PM concentration; and the processor determines that the weather is smoggy such that the driver's vision is adversely affected when the PM concentration exceeds a predetermined threshold.

8. The driving assistance system of claim 1, wherein the processor further superposes a visible light image obtained from the sensor with the thermal image to produce an image that emphasizing a position of objects that the driver on the subject vehicle should pay more attention to.

9. A driving assistance method to assist a driver in a subject vehicle, comprising:
   presetting a plurality of criteria to indicate a plurality of driving conditions in a database;
   collecting environmental data and thermal images surrounding the subject vehicle;
   determining one of the driving conditions indicating that the driver's vision is adversely affected when one of the preset criteria is met by comparing the collected environmental data against at least one of the preset criteria; and
   automatically displaying the thermal images on a display when the one of the driving condition indicating that the driver's vision is adversely affected is determined;
   identifying a glaring area on a collected visible light image, and determining that the vehicle in the opposite direction is approaching toward the subject vehicle and the illumination from the headlights adversely affects the driver in the subject vehicle when a size of the glaring area, a pixel amount of the glaring area, or a size ratio of the glaring area and the entire visible light image exceeds a predetermined threshold.

10. The driving assistance method of claim 9, further comprising sensing an intensity of ambient light and determining that a surrounding of the subject vehicle is dark such that the driver's vision is adversely affected when the intensity of ambient light less than a predetermined threshold.

11. The driving assistance method of claim 9, wherein one of the driving conditions is when the weather is misty such that the driver's vision is adversely affected.

12. The driving assistance method of claim 11, further comprising identifying a foggy area on the collected visible light image, and determining that the weather is misty such that the driver's vision is adversely affected when a degree of blurriness of an object on the visible light image exceeds a predetermined threshold.

13. The driving assistance method of claim 11, further comprising identifying a foggy area on the collected visible light image, and determining that the weather is misty such that the driver's vision is adversely affected when a brightness difference between an object and its neighboring scene is less than a predetermined threshold.

14. The driving assistance method of claim 11, further comprising collecting a temperature and a humidity, and determining that the weather is misty such that the driver's vision is adversely affected when the temperature and the humidity-meet the preset criteria.

15. The driving assistance method of claim 9, further comprising collecting a particulate matter (PM) concentration collected by the sensor and determining that the weather is smoggy such that the driver's vision is adversely affected when the PM concentration exceeds a predetermined threshold.

16. The driving assistance method of claim 9, further comprising superposing a visible light image with the thermal image to produce an image that emphasizing a position of objects-that the driver on the subject vehicle should pay more attention to.

* * * * *